United States Patent
Hoppe

(10) Patent No.: US 7,220,057 B2
(45) Date of Patent: May 22, 2007

(54) ROTATION-SLIDE BEARING

(75) Inventor: Stefan Hoppe, Sulz am Neckar (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 182 days.

(21) Appl. No.: 10/504,728

(22) PCT Filed: Jan. 29, 2003

(86) PCT No.: PCT/EP03/00901

§ 371 (c)(1),
(2), (4) Date: Feb. 3, 2005

(87) PCT Pub. No.: WO03/069173

PCT Pub. Date: Aug. 21, 2003

(65) Prior Publication Data

US 2005/0129341 A1 Jun. 16, 2005

(30) Foreign Application Priority Data

Feb. 15, 2002 (DE) ................................ 102 06 381
May 8, 2002 (DE) ................................ 102 20 611

(51) Int. Cl.
*F16C 17/10* (2006.01)
(52) U.S. Cl. ........................................ 384/280; 384/322
(58) Field of Classification Search ........ 384/280–292, 384/322, 368, 397, 414
See application file for complete search history.

(56) References Cited

U.S. PATENT DOCUMENTS

| | | | |
|---|---|---|---|
| 2,081,063 A * | 5/1937 | Oliver | ........................ 384/368 |
| 2,318,114 A | 5/1943 | Tichvinsky | |
| 3,043,636 A | 7/1962 | MacInnes et al. | |
| 3,160,449 A | 12/1964 | Scott | |
| 3,746,410 A | 7/1973 | Cameron | |
| 6,017,184 A | 1/2000 | Aguilar et al. | |

FOREIGN PATENT DOCUMENTS

| | | |
|---|---|---|
| DE | 937 499 | 1/1956 |
| DE | 1 860 860 | 10/1962 |

(Continued)

*Primary Examiner*—Thomas R. Hannon
(74) *Attorney, Agent, or Firm*—Scully, Scott, Murphy & Presser, P.C.

(57) ABSTRACT

The invention relates to a rotation-slide bearing (25c) which comprises an inner first bearing element (31) with an outer peripheral surface (31a) and an outer second bearing element (32) with an inner peripheral surface (32a). The outer bearing element (32) encloses the inner bearing element (31). At least one first oil groove (38) that extends in an approximately axial relation is provided in the outer peripheral surface (31a) of the inner first bearing element (31) and/or in the inner peripheral surface (32a) of the outer second bearing element (32). In order to improve a rotation-slide bearing of the aforementioned kind in such a way that it can absorb radial and axial forces and has good slide properties, a support shoulder (42a, 42b) with a slide surface (42c) is associated with one of the two bearing elements (31) on one or both sides and axially supports the bearing element (32) with its lateral surface (32c) facing it. At least one second oil groove (32c) that extends in an approximately radial relation is disposed in the slide surface (42c) or in the lateral surface (32c) supported by it. The oil grooves (46a, 46b, 38) communicate in the zone where they face one another.

18 Claims, 5 Drawing Sheets

FOREIGN PATENT DOCUMENTS

| | | |
|---|---|---|
| DE | 1 876 305 | 7/1963 |
| DE | 24 35 769 | 2/1976 |
| DE | 35 10389 A1 | 9/1986 |
| DE | 43 36 915 A1 | 5/1995 |
| DE | 296 10 799 U1 | 4/1997 |
| EP | 0 450 623 A1 | 10/1991 |
| GB | 1051632 | 12/1966 |

\* cited by examiner

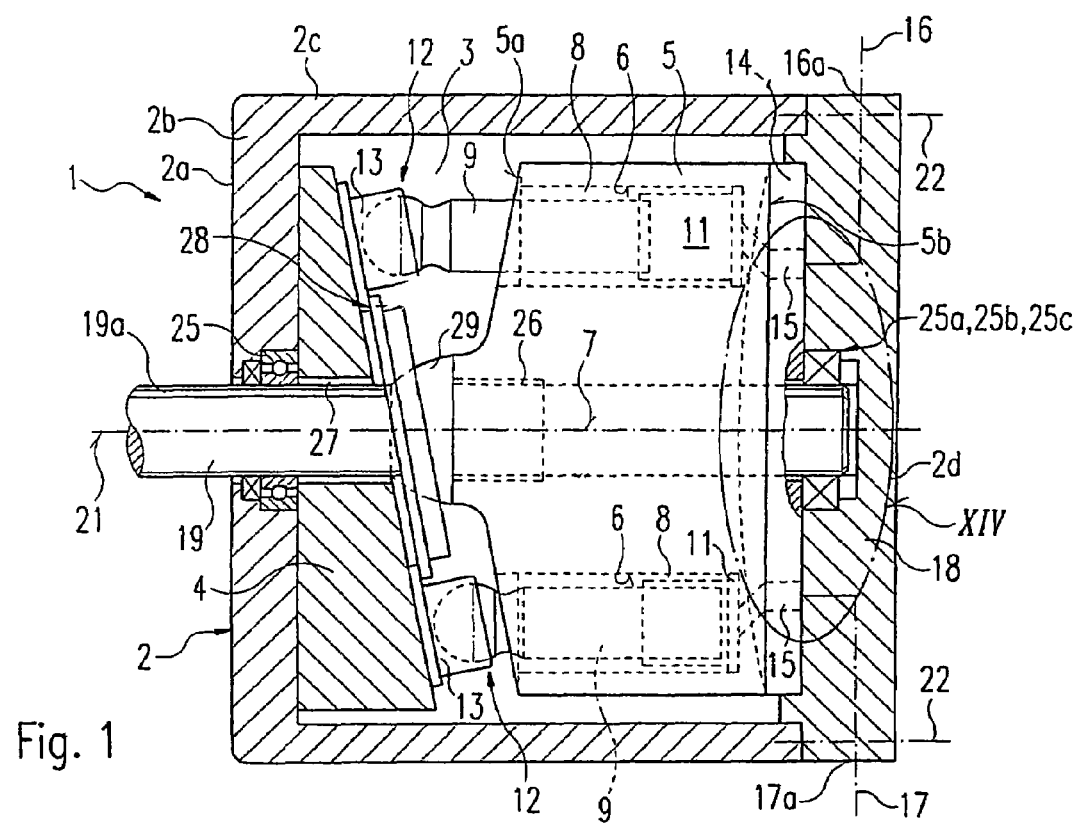
Fig. 1
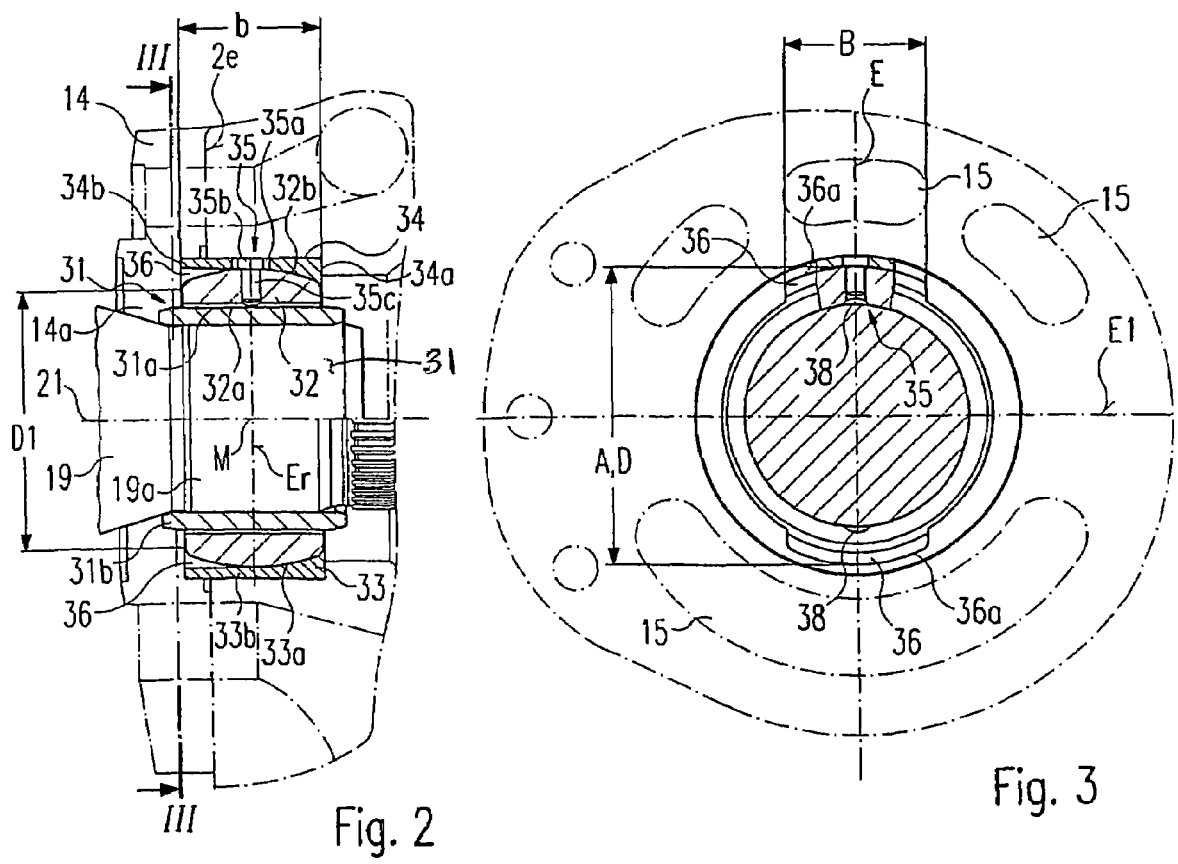
Fig. 2
Fig. 3

ROTATION-SLIDE BEARING

The invention relates to a rotary plain bearing, particularly for a drive shaft of an axial-piston machine.

In the majority of cases, shafts transmit torques, in which case they are subject mainly to radial loads and have to be mounted in radial bearings. At the same time, almost unavoidable axial forces occur and these can be taken by an axial bearing for the shaft. In an axial-piston machine, its shaft is subject to quite considerable axial loads, because the axially acting forces from the pistons are transmitted to the shaft. For this reason, the drive shaft of an axial-piston machine has to be mounted in load-carrying bearings both radially and axially. Rolling-element bearings or plain bearings may be used for this purpose. Rolling-element bearings are notable for being particularly free-running because, due to the rolling friction, their frictional losses are low. The load-bearing capacity of a rolling-element bearing on the other hand is relatively small, because the pressure per unit area on the rolling elements is high. In a plain bearing on the other hand, there is a relatively large area available for the sliding movement that occurs and the pressure per unit area can thus be kept relatively low. Plain bearings are thus particularly suitable for heavy bearing loads.

To keep the friction and wear in a plain bearing low, it is known from DE 43 36 915 A1 for wedge-shaped lubricant pads to receive a lubricant to be arranged in one of two mutually adjacent slide faces. No flow of the lubricant takes place through the lubricant pads.

The object underlying the invention is to design an existing rotary plain bearing in such a way that it is able to withstand radial and axial forces and has good sliding properties.

This object is achieved by virtue of the features of claim 1. Advantageous refinements of the invention are described in the subclaims.

In the rotary plain bearing according to the invention, one of the two bearing elements has associated with it, on one or both sides, a support shoulder having a slide face against which the other bearing element is supported axially by its side face adjacent the support shoulder. Also, lubricating grooves are arranged radially between the bearing elements and axially between one bearing element and the adjacent support shoulder or shoulders, the at least one radially extending lubricating groove and the at least one approximately axially extending lubricating groove in the mutually adjacent surface regions being connected together. This produces a combined radial and axial bearing which is simple and small in construction, something which is achieved by the combined design. The rotary plain bearing according to the invention may be so arranged in this case that it is supported axially in only one axial direction or in both axial directions and is in the form of an axial bearing. For this reason, the rotary bearing according to the invention is also suitable as a so-called fixed bearing which, is able to withstand axial and radial forces and can be arranged in combination with an axially spaced away, so-called loose bearing which withstands only radial forces.

Due to the presence of the lubricating grooves according to the invention, the rotary plain bearing according to the invention is well lubricated in operation in respect of both radial and axial forces, thus reducing friction and wear and giving the bearing a long working life. Due to the radial, or rather radially ascending, path followed by the at least one lubricating groove between the support shoulder and the bearing element supported thereby, there is produced, in operation, when the lubricating groove is arranged in the rotating bearing element and due to the centrifugal force that acts on the lubricant, a pumping or feeding action which operates automatically and which causes the lubricant to leave the lubricating groove in a radially outward direction and fresh lubricant to enter it radially on the inside, e.g. through the lubricating clearance that exists or through a special infeed opening or infeed passage. It is not only the approximately radially extending lubricating groove which benefits from this automatic outfeed and infeed of lubricant but also the approximately axially extending one, if it is connected to the first groove.

A forced-feed action on the lubricant in the approximately axially extending lubricating groove can be obtained if this lubricating groove is obliquely arranged. When this is the case, the slide face which is in sliding contact with the lubricant exerts on the lubricant a component of feeding force which is directed in the longitudinal direction of the lubricating groove, the direction of action being dependent on the direction of rotation and on whether the lubricating groove is situated in the rotating or non-rotating element of the bearing.

The feeding action which has been described above can be made forced in the region of the at least one approximately radially extending lubricating groove if the lubricating groove is so inclined that the lubricant situated in the groove is fed outwards as a result of the sliding contact with the slide face of the adjoining element acting as a component of force. If the lubricating groove is arranged in the element which rotates in operation, it is advantageous for the lubricating groove to be inclined in the opposite direction to the direction of rotation. If on the other hand the lubricating groove is arranged in the element which does not rotate, it is advantageous for the lubricating groove to be inclined in the direction of rotation of the adjoining rotating element to obtain the forced-feed action described above. This action can be obtained in two lubricating grooves arranged on the two sides of the bearing element concerned if the lubricating grooves are inclined in opposite directions to one another and are connected together, preferably by an axially or obliquely extending lubricating groove. The inner bearing element is preferably supported by at least one lateral support flange.

Other features of refinements of the invention relate to the mounting of the other, and particularly the outer or second, bearing element to have limited mobility as in a ball-joint. The latter can be obtained by forming the second bearing element to have, arranged in a transverse plane, a circumferential surface in the form of a section of a sphere by which it is seated in a recess in the form of a concave section of a sphere in a third bearing element or a wall of a housing. In addition to the axial support on at least one side, this produces a rotary plain bearing capable of movement as in a ball-joint which compensates for misalignments resulting from bending of the associated shaft, and thus protects the bearing from wear and overloading.

Other refinements of the invention relate to improving the rotary plain bearing in respect of its ability to be fitted and stripped out and to obtaining designs which are simple, small and reliable and having a long working life.

Advantageous embodiments of the rotary plain bearing according to the invention will be explained in detail below by reference to the drawings. In the drawings:

FIG. 1 is an axial section through an axial-piston machine.

FIG. 2 is an enlarged cross-sectional view of the detail marked II in FIG. 1 which includes a rotary plain bearing according to the invention.

FIG. 3 is a partial section on III—III in FIG. 2.

Figure 4:
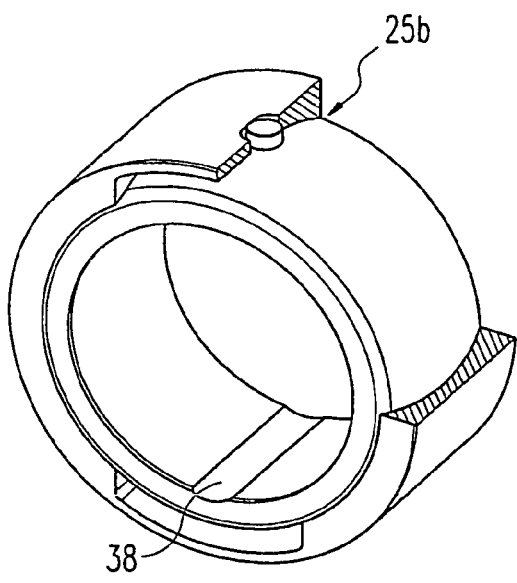
FIG. 4 is a perspective, partly cut-away, view of a rotary plain bearing according to the invention as a unit assembly.

The piston machine shown in FIG. 1, which is of a design shown by way of illustration and which is denoted as a whole by reference numeral 1, has a housing 2, in whose interior 3 a swash-plate 4 and a cylindrical drum 5 are arranged next to one another. Arranged in the cylindrical drum 5, distributed around the circumference thereof, are holes 6 for pistons, which holes 6 extend, in the present embodiment of axial-piston machine, substantially parallel to a centre axis 7 of the cylindrical drum 5 and are open at the end-face 5a of the cylindrical drum 5 which is adjacent the swash-plate 4. Firmly inserted in the bushed holes 6, preferably by being pressed in, are guide bushes 8.

Mounted in the guide bushes 8 to be displaceable substantially axially are pistons 9, which are preferably cylindrical and whose heads form the boundaries, in the direction of the swash-plate 4, of working chambers 11 in the cylindrical drum 5. The foot-ends of the pistons 9, which are adjacent the swash-plate 4, are each supported on the swash-plate 4 by a joint 12, in which case there may be slide-shoes 13 present, between which and the foot-ends the joints 12 are arranged, which joints 12 are preferably in the form of ball-joints having a ball-head and a spherical recess.

The end-face 5b of the cylindrical drum 5 which is remote from the swash-plate 4 rests against a control disc 14 in which are arranged at least two control openings 15 in the form of kidney-shaped though-holes which form parts of an infeed duct 16 and an outfeed duct 17 which are merely indicated and which extend through an adjacent wall 18 of the housing against which the control disc 14 is held. The cylindrical drum 5 is arranged on a drive shaft 19 which is rotatably mounted in the housing 2 and whose axis of rotation 21 extends coaxially to the center axis 7 of the cylindrical drum 5.

In the present embodiment, the housing 2 is made up of a cup-shaped housing part 2a having an end-wall 2b and a circumferential wall 2c and of a cover or connecting part 2d which forms the wall 18 of the housing and which rests against the free edge of the circumferential wall 2c and is screwed thereto by screws 22 which are merely indicated. To connect up with the infeed and outfeed ducts 16, 17 which run on outwards, pipe connections 16a, 17a are provided on the connecting part 2d. The drive shaft 19, which passes through the cylindrical drum 5 in a mounting bore, is rotatably mounted and sealed in bearing seatings in the housing end-wall 2b and in the cover 2d by means of suitable bearings 25, 25a, and in this case it passes through the housing end-wall 2b axially and has a stub drive-end 19a which projects from the housing end-wall 2b.

In this embodiment where the piston machine 1 is in the form of a swash-plate machine, the cylindrical drum 5 is arranged on the drive shaft 19 to be solid in rotation therewith by means of a rotary entrainment connection 26, e.g. a toothed coupling 28, 29 with the drive shaft 19 passing through the swash0plate 4, which is arranged in a fixed position on the housing end-wall 2 or is formed thereon, in a through-hole 27. in the present embodiment, the cylindrical drum 5 r4otates relative to the swash-plate 4 in working operation, the pistons 9 being moved longitudinally towards the working chambers 11 and back again.

In the embodiment, the rear bearing 25a, which is mounted in the housing wall 18, i.e. in the connecting part 2d, is a rotary plain bearing 25b which is combined with a rotary plain bearing 25c capable of motion as in a ball-joint, thus enabling it to mount the drive shaft 19 in such a way as to be rotatable and also to compensate for shortcomings in the alignment of the bearings 25, 25a and/or for bending of the drive shaft 19 which occurs in working operation. This prevents or reduces tipping at the rotary plain bearing 25b, which improves the sliding action, reduces friction and heating-up in the rotary plain bearing 25d and extends its working life.

The rotary plain bearing 25c which is capable of motion as in a ball-joint and which is combined in the manner described above has an inner first bearing element 31 having an outer first slide face 31a by which it is rotatably mounted with a sliding clearance in an outer second bearing element 32 having an inner second slide face 32a. Consequently, the outer second bearing element 32 surrounds the inner first bearing element 31, the outer second bearing element 32 being, at least at its outer circumference, in the form of a ring having an outer third bearing surface 32b in the form of a zone of a sphere, by which surface 32b it is made capable of limited mobility as in a ball-joint. What this means is that it is mounted in such a way that it can be tilted in all directions in relation to the axis of rotation 21, in a third bearing element 33 having an inner fourth bearing surface 33a which is at least partly in the shape of a corresponding section of a sphere.

In the embodiment, the second bearing element 32 and the third bearing element 33 are in the form of rings, which may for example be of the same width b axially. In the embodiment, the first bearing element 31 is wider than the second and third bearing elements 32, 33 and projects beyond them on, for example, both sides.

In the embodiment, the first bearing element 31 is also formed by a bearing sleeve 31b, preferably of hollow cylindrical cross-section, which is arranged on a stub mounting end 19a of the drive shaft 19 to be solid in rotation therewith, e.g. is a press-fit on the stub mounting end 19a.

The third bearing element 33 is preferably also a bearing sleeve 33b, which is mounted in or on the part carrying it in such a way as to be fixed in rotation, it being mounted on the cover or connecting part 2d in this case. Provided for this purpose in the latter is a bearing bore 34 for the round third bearing element 33, which bore 34 preferably has a shoulder face 34a formed by an interior step, which face 34a forms an outer stop for the third bearing element 33 in the axial direction. In the embodiment, the bearing bore 34 extends inwards beyond the interface 2e between the connecting part 2d and the control disc 14 and into the latter, there preferably also being a shoulder face 34b arranged at this point, which forms an inwards stop for the bearing element 33, by which means it is positively located axially. In this embodiment, the bearing sleeve 33b forms a centering spigot to centre the control disc 14.

The embodiments shown in FIGS. 1 to 9 and 11 to 13 are set up for rotary movement between the first and second bearing elements 31, 32 and for movement as in a ball-joint or tilting movement between the second and third bearing elements 32, 33. To prevent rotary movement about the axis of rotation 21 between the second and third bearing elements 32, 33, there is provided between the second and third bearing elements 32, 33 a rotation-blocking arrangement 35 which operates by positive interengagement and which has a spigot connection. The spigot connection comprises a blocking spigot 35b which projects from one of the two bearing elements 32, 33 and engages in a slotted hole 35a in the other bearing element 32, 33, the slotted hole 35a extending longitudinally on the axis of rotation 21. The slotted hole 35a and the blocking spigot 35b are also situated in that radial plane Er of the relevant bearing element 32, 33 which contains the centre of curvature M. Consequently, rotary movement between the bearing elements 32, 33 is blocked but a limited tilting movement in all directions, which permits the compensating action described above, is possible.

The blocking spigot 35b may be formed by a round pin 35c which is securely mounted in a bore in one of the bearing elements 32, 33, e.g. is pressed thereinto, and whose projecting, e.g. thickened, head engages with clearance for movement in the slotted hole 35a in the other bearing element 32, 33. In the embodiment, the hole for the pin is arranged in the second bearing element 32 and the slotted hole 35a is arranged in the third bearing element 33.

The blocking spigot 35b is preferably arranged in the longitudinal centre plane E which symmetrically intersects the control openings 15, or in longitudinal centre plane E1 which extends perpendicularly thereto. This is because the sum of the forces from the pistons exerts a resultant transverse force on the drive shaft 19 which acts in the longitudinal centre plane E and which, being a torque, may cause the drive shaft 19 to bend slightly, which is compensated for by a tilting movement in the longitudinal centre plane E. The bearing 25c capable of movement as in a ball-joint is able to perform this tilting movement in all transverse directions without any problems, particularly when the slotted hole 35a extends in the longitudinal centre plane E or even when it is situated in the longitudinal centre plane E1. When it is in this position, a tilting movement as described above takes place about the transversely extending centre axis of the blocking spigot 35b.

The third bearing element 33 has on one side an axial insertion groove 36 whose transverse dimensions A, B and whose cross-sectional shape are arranged to be larger than the axial cross-sectional shape and size of the second bearing element 32, thus enabling the latter to be inserted in the insertion groove 36 in a position in which it is rotated through an angle, e.g. a position in which it is rotated through an angle of 90°. The axial length 36 of the insertion groove 36 is made sufficiently large for the second bearing element 32 to be able to be slid in it to an intermediate position shown in FIG. 5 in which the centres of curvature of the third and fourth bearing surfaces 32a, 33a are situated on the common centre of curvature M and thus coincide with one another. In this position, the second bearing element 32 can be turned to its final position in which its longitudinal centre axis approximately lines up with the longitudinal centre axis of the third bearing element 33. In this turned-back position, the second bearing element 32 is positively located axially in the third bearing element 33 by the undercut in the fourth bearing surface 33a which is in the form of a section of a sphere.

In the embodiment, there are two insertion grooves 36 arranged in diametrically opposed positions as mirror images of one another, thus enabling the second bearing element 32 to be inserted centrally into the third bearing element 33. The floor faces 36a of the insertion grooves 36, which floor faces 36a are situated opposite one another and are preferably rounded in cross-section to match the diameter D of the second bearing element 32, are preferably arranged to be tangential to the fourth bearing surface 33a in the form of a section of a sphere, which means that they end centrally in the third bearing element 33 and merge with the fourth bearing surface 33a in the form of a section of a sphere. This has the particular advantage that the second bearing element 32, when being inserted, finds stops for the movement by which it is being inserted on those portions of the fourth bearing surface 33a in the form of a section of a sphere which are situated axially opposite the insertion grooves 36, and does so in the intermediate position in which the centres of curvature coincide with one another and the second bearing element 32 is rotatable. This ensures that fitting is easy and convenient as far as manipulation is concerned. The second bearing element 32 only needs to be moved as far as an insertion stop and then turned.

In the embodiment, the width B of the at least one insertion groove 36 is approximately ½ to ⅓ of the diameter D of the second bearing element 32. When it is of this size, there are, as well as the at least one insertion groove 36, sufficiently large portions of the fourth bearing surface 33a in the form of a section of a sphere to provide the positively engaging undercut in the axial direction.

A press-fit between the circumference of the third bearing element 33 and the wall of the bearing bore 34 may be used to lock the third bearing element 33 in rotation in the wall 18 of the housing. In the embodiment shown in FIG. 8, in which the same or comparable parts are given the same reference numerals, there is also a rotation-blocking arrangement 37 acting by positive interengagement, in the form of a spigot connection, provided to lock the third bearing element 33 in rotation in the wall 18 of the housing, i.e. in the connecting part 2d. What preferably serves this purpose is the blocking spigot 35b, which passes through the third bearing element 33 and engages in a slotted hole 37a in the wall 18 of the housing, which slotted holes 37a substantially corresponds to the slotted hole 35a. In this embodiment, not only the second bearing element 32 but also the third bearing element 33 is positively located at the wall 18 of the housing to stop rotation in the circumferential direction.

The second bearing element 32 is fitted, and the blocking spigot 35b is inserted in the slotted hole 35a, by inserting the second bearing element 32 in a position in which it, and the blocking spigot 35b, is rotated relative to the slotted hole 35a sufficiently far (FIG. 6) for the blocking spigot 35b to be able to be inserted in the insertion groove 36. When the blocking spigot 35b is in the region of the slotted hole 35a, the second bearing element 32 is rotated back, and when this is done the blocking spigot 35b enters the slotted hole 35a. This can be done without any problems because of the second bearing element 32 being in the shape of a section of a sphere.

Figure 8:
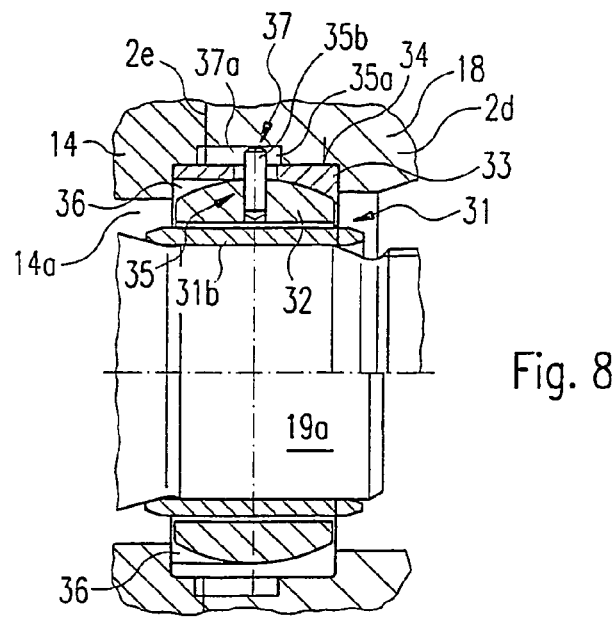
FIG. 8 is an axial section through a modified embodiment of rotary plain bearing

Given suitable sizing, it is even possible in the case of the embodiment shown in FIG. 8 for the elongated blocking spigot 35b to be inserted in the slotted holes 35a, 37a, which is done by inserting the second bearing element 33 in a rotated position and then rotating it back, in the way that has already been described for the embodiment shown in FIGS. 2 to 6. It is however also possible for the slotted hole 37a to open towards the side from which the third bearing element 33 can be slid into the bearing bore 34. In this embodiment, the third bearing element 33, with the second bearing element 32 mounted in it, can be slid into the bearing bore 34, and the blocking spigot 35b is inserted in the slotted hole 37a at the same time. In the embodiment shown in FIG. 8, this is possible from the inner side, because the slotted hole 37a opens towards the interface 2e between the wall 18 of the housing and the control disc 14 and the rotary plain bearing 25c capable of movement as in a ball-joint can be fitted to the control disc 14 prior to the control disc 14 being mounted against the wall 18 of the housing or prior to the wall 18 of the housing being mounted against the control disc 14.

Figure 9:
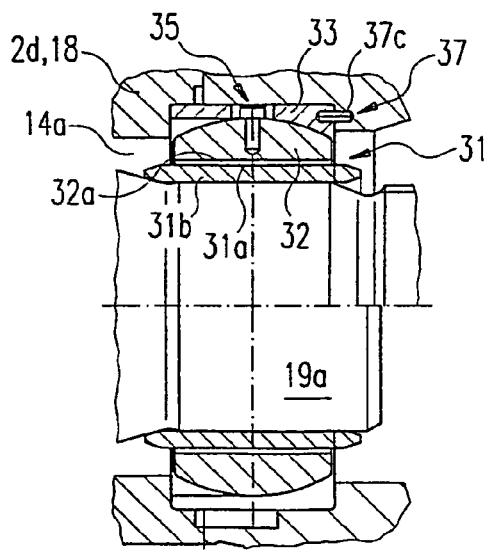
FIG. 9 is an axial section through an embodiment of rotary plain bearing which has been further modified.

In the embodiment shown in FIG. 9, in which the same or comparable parts are given the same reference numerals, a different form 37 of the rotation-blocking arrangement is provided, in which case the rotation-blocking arrangement 35 may be of the form shown in FIG. 8. As shown in FIG. 9, the rotation-blocking arrangement 37 is likewise formed by a spigot connection but the connection is arranged not transversely to the axis of rotation 21 but parallel thereto and is formed by a blocking pin 37c which is arranged in the region of the step face and engages in holes situated opposite one another in the wall 18 of the housing and in the third bearing element 33.

Figure 10:
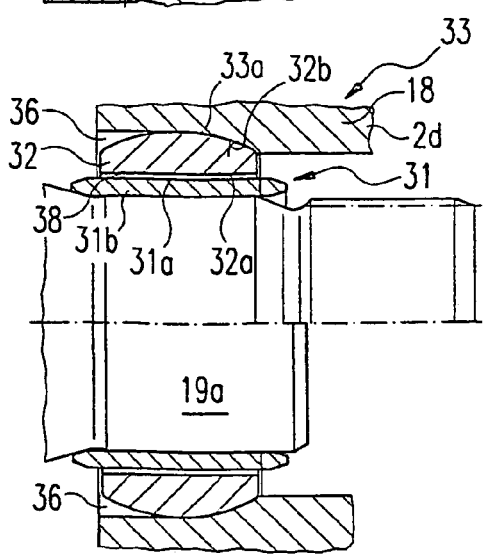
FIG. 10 is an axial section through an embodiment of rotary plain bearing which has been further modified.

The embodiment shown in FIG. 10, in which the same or comparable parts are likewise given the same reference numerals, makes it clear that there is no need for a separate third bearing element 33 if the inner fourth bearing surface 33a and the at least one insertion groove 36 are formed directly in the wall 18 of the housing, i.e. in the connecting part 2d. In this embodiment too, blocking arrangements as shown in FIG. 8 or FIG. 9 may be provided, in which case the slotted hole 35a may be arranged in the wall 18 of the housing (though this is not shown).

In the present piston machine or axial-piston machine 1, there is present in the interior 3 hydraulic fluid, e.g. hydraulic oil, which, in working operation, may be used to lubricate the slide faces 31a, 32a and preferably the bearing surfaces 32b, 33a too. A water-containing lubricant liquid which contains approximately 50% water and approximately 50% glycol and which is known to the trade by the name HFC is particularly suitable as a lubricant liquid.

To ensure access for the lubricant liquid situated in the interior 3, particularly to the rotary plain bearing 25b, it is advantageous for an axial through-passage 14a which provides access for the lubricant liquid at least to the rotary plain bearing 25b to be provided between the control disc 14 and the drive shaft 19. In the embodiment, the control disc 14 has a through-hole which surrounds the drive shaft 19 at an annular distance. The diameter D1 of the through-hole is preferably larger than the outside diameter of the first bearing element 31 or the bearing sleeve 31b, thus ensuring annular access to the slide faces 31a, 33a and preferably also to the bearing surfaces 32b, 33a.

To further improve the lubrication, it is advantageous for one or more lubricating grooves 38, which are arranged to be distributed around the circumference and which may extend axially, or obliquely or helically, as shown in FIGS. 2 to 7, to be provided in at least one of the slide faces 33a, 32a, this being done in the inner second slide face 32a in the present case. If the at least one lubricating groove 38 is arranged to be oblique or helical, there is produced on each axial side of the second bearing element 32 a load-bearing region B1 which is defined by the associated edge of the lubricating groove 38 and an axially extending slide face line 39.

In the embodiments described above, the rotary plain bearing 25c is what is called a loose bearing in relation to the drive shaft 19, i.e. there is no mutual axial support between the drive shaft 19, or rather the first bearing element 32 which is arranged in a fixed position thereon, and the second bearing element 32. There is on the other hand axial support of this kind between the third bearing element 33 and the housing 2 or rather the wall 18 of the housing which holds the rotary plain bearing 25b. However, there are also types of operation in which it is desirable for there to be axial support between the first and second bearing elements 31, 32 in at least one axial direction. This can be achieved by setting a limit for the second bearing element 32 on one or both sides by means in each case of a shoulder or slide face which is arranged on the drive shaft 19 or an added part. A rotary plain bearing of this kind which is a fixed bearing in at least one axial direction can be formed as a rotary plain bearing 25b having two bearing elements 31, 32 or as a tiltable rotary plain bearing 25c having the second and third bearing elements 32, 33 and can thus withstand axial forces in one or both axial directions.

Figure 11:
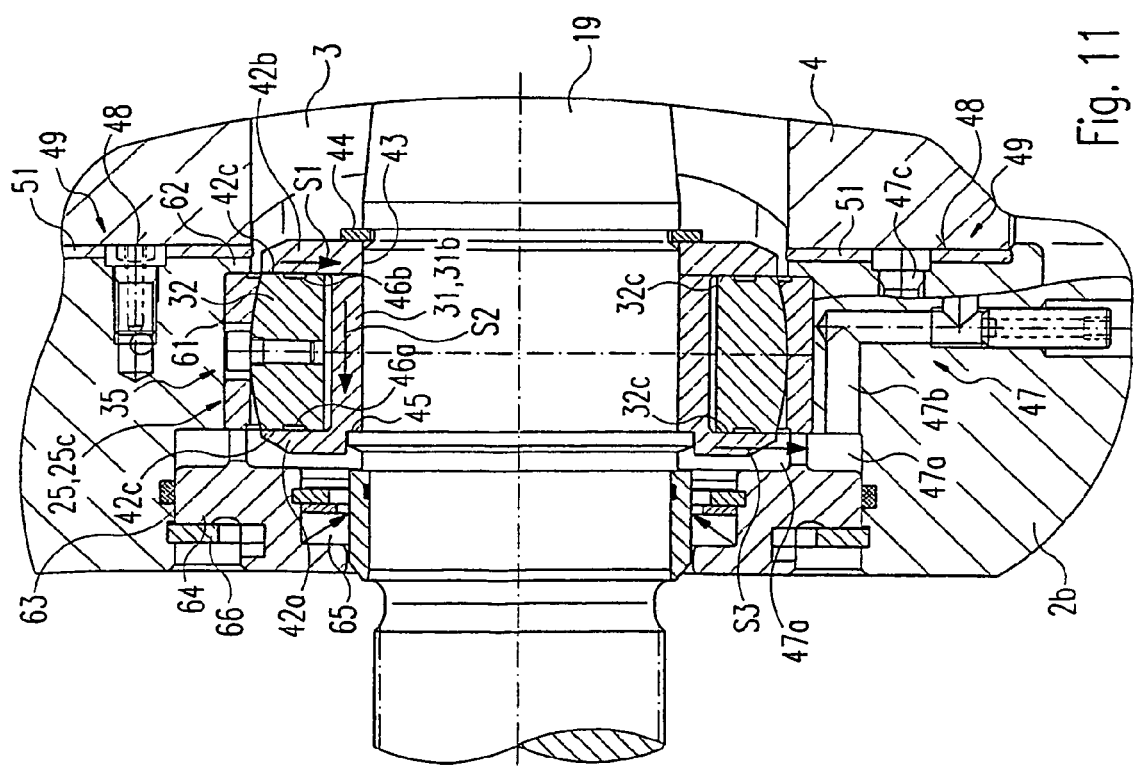
FIG. 11 is a view in axial section of a modified embodiment of rotary plain bearing according to the invention.

In the embodiment shown in FIG. 11, in which the same or comparable parts are given the same reference numerals, the rotary plain bearing 25c is arranged in the region of the housing 2, in the housing end-wall 2b in the present case, in the form of a fixed bearing operative in both axial directions, in which case it may form the bearing 25a arranged in the connecting part 2d or, preferably, the bearing 25 arranged in the housing end-wall 2b, as shown in FIG. 11. With clearance for movement, a limit is set for the second bearing element 32 at both end-faces by a support flange 42a, 42b, which is fixed axially on the drive shaft 19 or the first bearing element 31. In the embodiment, one support flange, the outer support flange 42a in the present case, is connected in one piece to the first bearing element 31, with these items forming an angled annular body, and the inner support flange 42b has a co-axial hole 43, by the edge of which hole it is mounted on the drive shaft 19 with a small amount of clearance for movement. On the side remote from the rotary plain bearing 25c, the support flange 42b may be supported axially by a shoulder 44 on the drive shaft which, in the embodiment, is formed by a spring ring which fits into an annular groove in the drive shaft 19. The first bearing element 31 preferably extends to that face of the second support flange 42b which is adjacent to it, and in the other axial direction, in the outwards direction in the present case, it is supported axially by a shoulder 45 on the drive shaft, which shoulder 45 may project in one piece from the drive shaft 19 as an annular flange.

For lubrication purposes, there are provided in each of the shoulder or slide faces 42c of the support flanges 42a, 42b (not shown) or in each of the end-faces 32c of the second bearing element 32, one or more lubricating grooves 46a, 46b which are arranged to be distributed around the 46a, 46b which are arranged to be distributed around the periphery, which extend from the inside outwards, and which are connected in the radially inward direction to a lubricant infeed duct and in the radially outward direction to a lubricant outfeed duct and are thus part of a lubricant circuit 47 through which a lubricant, e.g., hydraulic oil, flows when the piston machine is operating. A special lubrication pump is not required to maintain the flow in the lubricant circuit 47. The lubricant, which is present in the lubricating grooves 46a, 46b in operation produces the flow in the circuit 47 automatically as a result of the centrifugal force 4 acting on it. The lubricant circuit 47 may for example be connected to the interior 3 of the housing 2 through lubrication groove 47c.

An additional feeding action on the lubricant can be obtained when the lubricating grooves 46a, 46b are inclined, and particularly when the lubricating grooves 46a on one side and the lubricating grooves 46b on the other side are inclined in opposite directions to one another. The lubricating grooves 46a (not shown) situated in the rotating bearing element, in the support flanges 42a, 42b in the present case, may be inclined in the opposite direction to the direction of rotation of the rotating bearing element, or the lubricating grooves 46a, 46b situated in the non-rotating bearing element, in the second bearing element 31 in the present case, may be inclined in the direction of rotation. The inclination may also be of a spiral form. In these embodiments, a forced-feed action on the lubricant is created by the contact between the slide faces, i.e. the support flanges 42a, 42b in the present case, and the columns of lubricant situated in the lubricating grooves 46a, 46b. In the embodiment, in which the lubricating grooves 46a, 46b are arranged in the non-rotating second bearing element 32, the forced-feed action is created by the contact which is made by the slide faces 42c of the rotating first bearing element 31, which latter is formed by the support flanges 42a, 42b.

Figure 5:
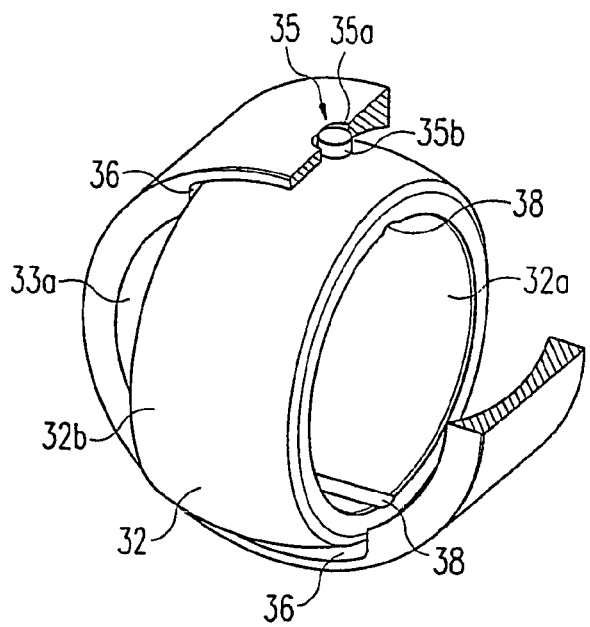
FIG. 5 shows the rotary plain bearing of FIG. 4 in a different operating position.
Figure 6:
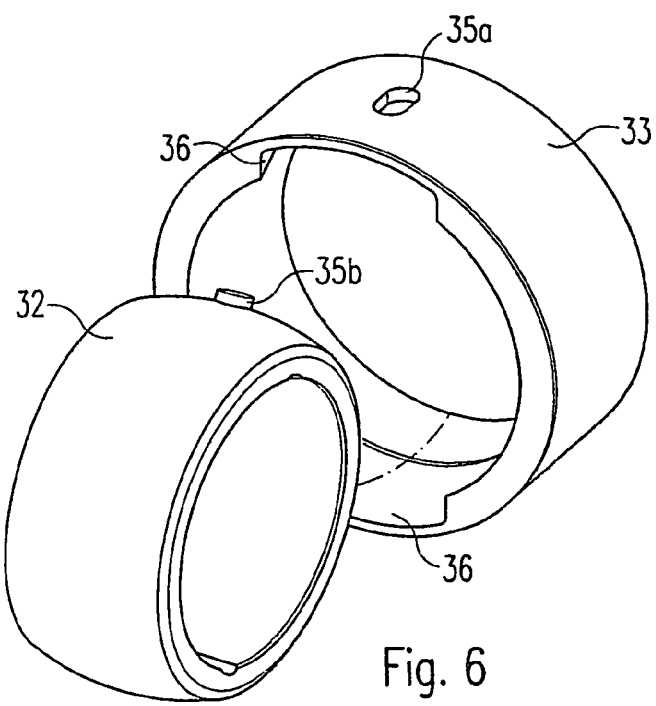
FIG. 6 shows the rotary plain bearing in a pre-assembly position.
Figure 7:
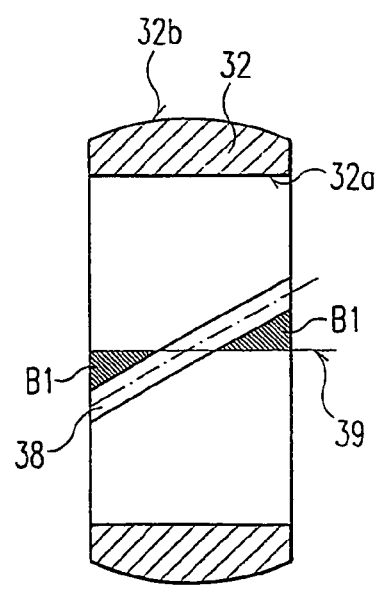
FIG. 7 is an axial section through an outer element of the rotary plain bearing.

In the embodiment, mutually associated lubricating grooves 46a, 46b which are arranged on the two sides of the second bearing element 32 are connected to the at least one lubricating groove 38, which may be situated in the outer circumferential surface of the first bearing element 31 or in the inner circumferential surface of the second bearing element 32 and may extend axially in this case, as is shown in FIGS. 4 and 5 for example, or may extend obliquely, as is shown in FIG. 7 for example. If the lubricating groove 38 follows an oblique path, the forced-feed action is also created in the region of the lubricating groove 38. The feeding action is produced by the contact which the slide face, which is adjacent the lubricant in the at least one lubricating groove 38, makes with the lubricant. The lubricating grooves 46a, 46b which are connected by the straight lubricating groove 38, or the lubricating grooves 46a, 46b which are connected by an oblique lubricating groove 38, and also the oblique lubricating groove 38, are orientated in such a way that the feeding action operates in successive directions and a feeding action which is continuous in the sections of lubricating groove 46b, 38, 46a results. In operation, the lubricant then enters at the radially outer end of the lubricating groove or grooves on one side and exits at the radially outer end of the lubricating groove or grooves on the other side. The axial path followed by the feeding action and the outward or inward direction of feed depend on the direction of rotation of the drive shaft 19 or of the first bearing element 31.

In the embodiment, the lubricant circuit 47 is formed by having the lubricant grooves 46b on the inside open to the interior 3 in a radially outward direction. The lubricating grooves 46a on the outside are likewise open in a radially outward direction and may likewise be connected to the interior 3, by a lubricant passage (not shown).

FIG. 11 shows an embodiment in which pivot-bearing lubrication for a pivotable swash-plate 4 which is known per se is included in addition in the lubricant circuit 47. In this embodiment, the lubricant grooves 46a open radially outwards into a preferably annular gap or section of lubricant passage 47a from which there extends, in the housing end-wall 2b, a lubricant passage 47b which continues, e.g. at an angle, to the plain bearing surface 48 of a pivot bearing 49 for the swash-plate 4 which, in this embodiment, is pivotably mounted, the passage 47b passing through, as it continues, a bearing shell 51 of the pivot bearing 49. The pivot bearing 49 which is arranged at the other end of the piston machine 1 in relation to the axis of rotation 7 of the drive shaft 19 can be connected to the lubricant circuit 47 in the same way, but for reasons of simplicity this has not been shown.

In the embodiment, the directions of flow of the flow in the circuit in the region of the rotary plain bearing 25c are directed, starting from the openings of the lubricant passages 46b, first radially inwards, then axially outwards and then radially outwards, see S1, S2, S3.

Figure 13:
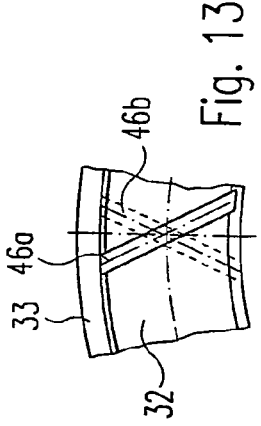
FIG. 13 is an end-on view of a portion of the rotary plain bearing.

FIG. 13 shows the lubricant grooves 46a, 46b inclined in mutually opposed directions on the two sides of the second bearing element 32.

Figure 12:
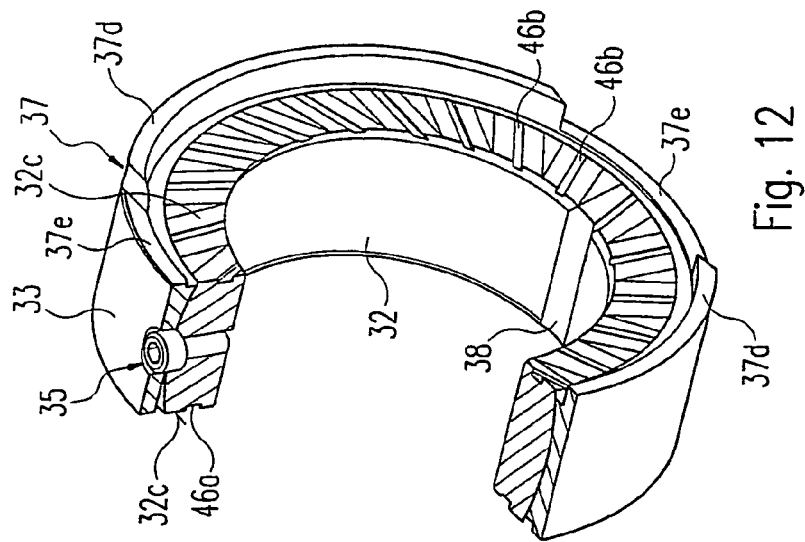
FIG. 12 is a perspective view of a second and a third element of the rotary plain bearing.

In the embodiment shown in FIG. 12, an axially operative anti-rotation locking means 37 is formed by having one or more, e.g. two, sectors 37d situated in opposite positions to one another project axially from the annular body of the third bearing element 33, which sectors 37d co-operate by positive interengagement, for the purpose of anti-rotation locking, with locating recesses which are arranged directly or indirectly in the housing 2 or its end-wall 2b and in which the sectors 37d engage, or with one or more locating spigots which engage in the at least one recess 37e which exists between two sectors.

In the embodiment, the third element 33 of the rotary plain bearing 25c is seated in a bearing bore 61 which has on the inside an abutment shoulder 62 for the third bearing element 33 and which, towards the outside, widens in a stepped shape, a closure ring 64 having a ring seal 65 for the drive shaft 19 being inserted in the larger step 63 of the bore and being secured axially by a circlip 66.

Figure 14:
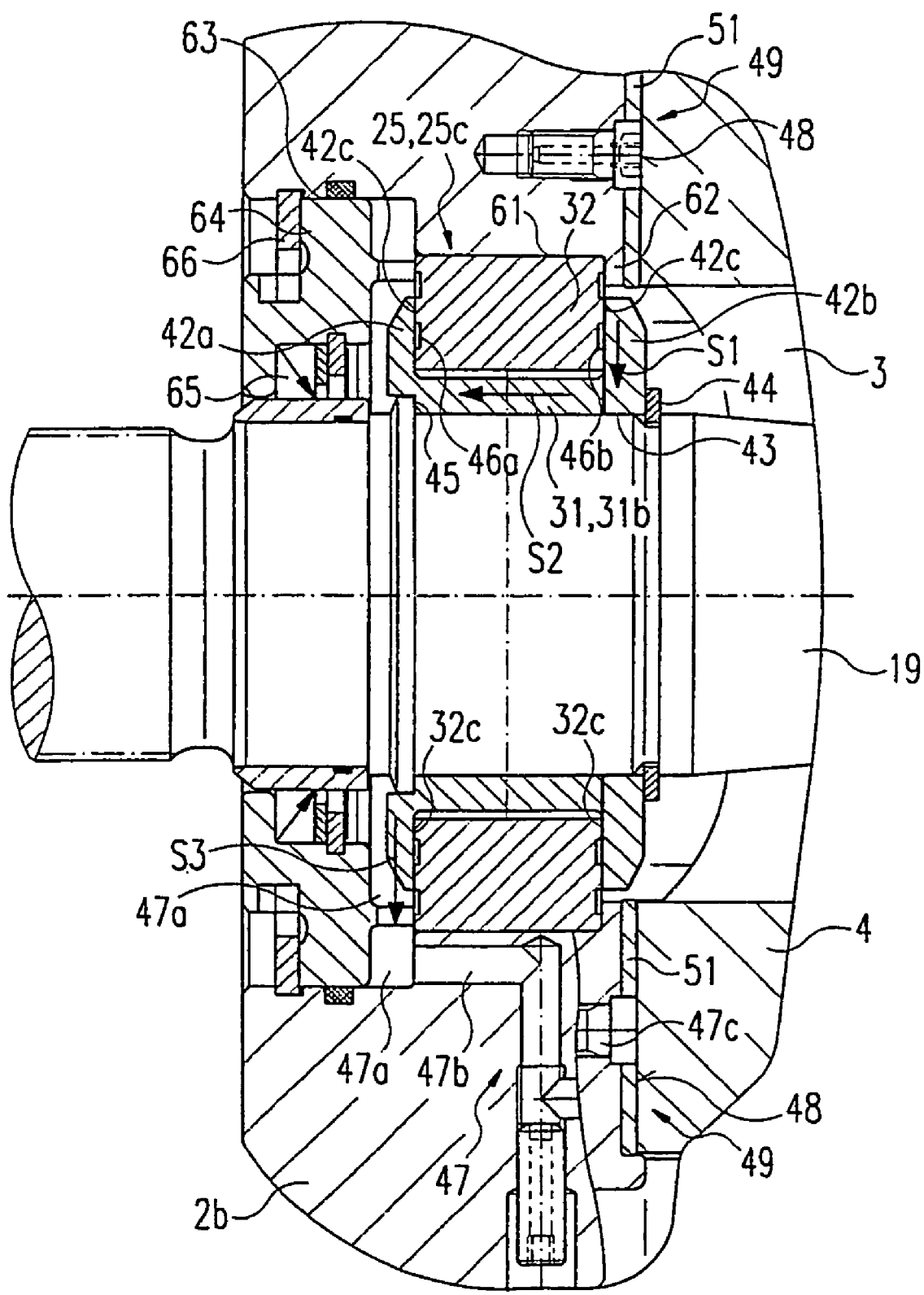
FIG. 14 is an enlarged cross-sectional view of the detail marked XIV in FIG. 1, containing a modified embodiment of plain bearing according to the invention.

In the embodiment shown in FIG. 14, in which the same or comparable parts are once again given the same reference numerals, axial support is produced for the second bearing element 32 as shown in FIG. 11 in a rotary plain bearing 25b which is not capable of movement as in a ball-joint and whose outer second bearing element 32 is cylindrical in form and is inserted in a matched bearing bore 61, e.g. in the housing end-wall 2b. Otherwise, including the position and design of the support flanges 42a, 42b and the lubrication grooves 46a, 46b, the embodiment shown in FIG. 14 corresponds to that shown in FIG. 11, to the whole of which the reader is referred, for which reason any fresh description can be omitted.

The invention claimed is:

1. Rotary plain bearing for a drive shaft of a piston machine, and an axial-piston machine, which has an inner first bearing element having a circumferential surface and an outer second bearing element having an inner circumferential surface, the outer bearing element surrounding the inner bearing element, which is constructed as a bearing sleeve and which is secured and fastened against relative rotation on a drive shaft of said piston machine, wherein at least one first lubricating groove which extends through continuously and approximately axially is provided in the circumferential surface of the inner first bearing element and/or in the inner circumferential surface of the outer second bearing element, wherein one of the two bearing elements has associated with it, on one or both sides, a support shoulder having a slide face against which the bearing element is supported axially by its side face adjacent the support shoulder, wherein at least one approximately radially extending second lubricating groove is arranged in the slide face or in the side face supported thereagainst, wherein the lubricating grooves (46a, 46b, 38) are connected to one another in the region where they are mutually adjacent, and
wherein the one or one of the two support shoulders is connected in one piece to selectively the second or the first bearing element.

2. Rotary plain bearing according to claim 1, wherein on at least one side of selectively the first or second bearing element at least one of said lubricating grooves is inclined in a circumferential direction.

3. Rotary plain bearing according to claim 2, wherein the lubricating grooves are inclined in opposite directions to one another and are arranged on the two sides of first and second bearing elements.

4. Rotary plain bearing according to claim 1, wherein the at least one first lubricating groove extends obliquely.

5. Rotary plain bearing according to claim 1, wherein the lubricating grooves are collectively part of a flow circuit which is connected to the interior of the piston machine.

6. Rotary plain bearing according to claim 1, wherein a support shoulder is formed by a separate annular disc which is mounted on the drive shaft.

7. Rotary plain bearing according to claim 1, wherein the outer bearing element is formed to include on its outer circumference, a third bearing surface in the form of a section of a sphere, by which said outer bearing element is mounted with a limited mobility in a ball-joint like arrangement in a third bearing element which has an inner fourth bearing surface in the form of a section of a sphere which surrounds the third bearing surface and arranged on one side of the third bearing element is at least one insertion groove at which the second bearing element can be inserted into the third bearing element, in an angularly rotated position, to a position at which the centers of curvature of the third and fourth bearing surfaces substantially coincide with one another.

8. Rotary plain bearing according to claim 7, wherein two said insertion grooves are arranged in opposite positions to one another.

9. Rotary plain bearing according to claim 8, wherein floor faces of the insertion grooves extend tangentially into the inner fourth bearing surface in the form of a section of a sphere.

10. Rotary plain bearing according to claim 7, wherein the width (B) of the insertion groove is approximately ⅓ to ½ of the diameter (D) of the second bearing element and the width (b) of the second bearing element is, at least allowing for clearance for movement, smaller than the width (B) of the insertion groove.

11. Rotary plain bearing according to claim 7, wherein a rotation-blocking arrangement is arranged between the second and third bearing elements.

12. Rotary plain bearing according to claim 11, wherein the rotation-blocking arrangement is formed by a spigot connection between the second and third bearing elements and a blocking spigot fastened to the outer second bearing element engages, with axial clearance for movement, in an opening in the other bearing element which is formed by an axial slotted hole.

13. Rotary plain bearing according to claim 7, wherein the third bearing element is a sleeve-like bearing element which is seated in a bearing bore in an additional bearing element.

14. Rotary plain bearing according to claim 13, wherein the additional further bearing element is formed by a connecting part of a piston machine, such as an axial-piston machine.

15. Rotary plain bearing according to claim 14, wherein the sleeve-like bearing element has a limit set therefor on the inner side by a control disc which is arranged on the inside of the connecting part.

16. Rotary plain bearing according to claim 14 wherein a control disc is arranged on the inside of the connecting part, an axial through-passage for a lubricant liquid being selectively arranged in the control disc or between the control disc and a drive shaft carrying the first bearing element.

17. Rotary plain bearing according to claim 1, wherein said bearing sleeve which constitutes said inner bearing element extends, from the side at which there is arranged the support shoulder, unitarily up to the opposite side.

18. Rotary plain bearing according to claim 17, wherein at said opposite side said bearing element is extended, and a further support shoulder is formed by a ring-shaped element.

* * * * *